March 17, 1931.  R. S. SANFORD  1,796,809
BRAKE
Filed June 20, 1927
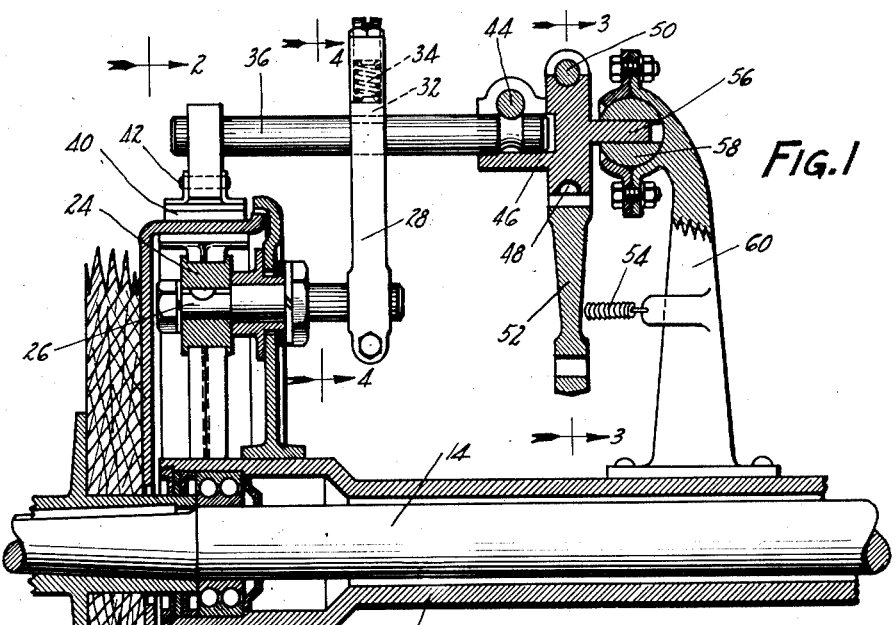
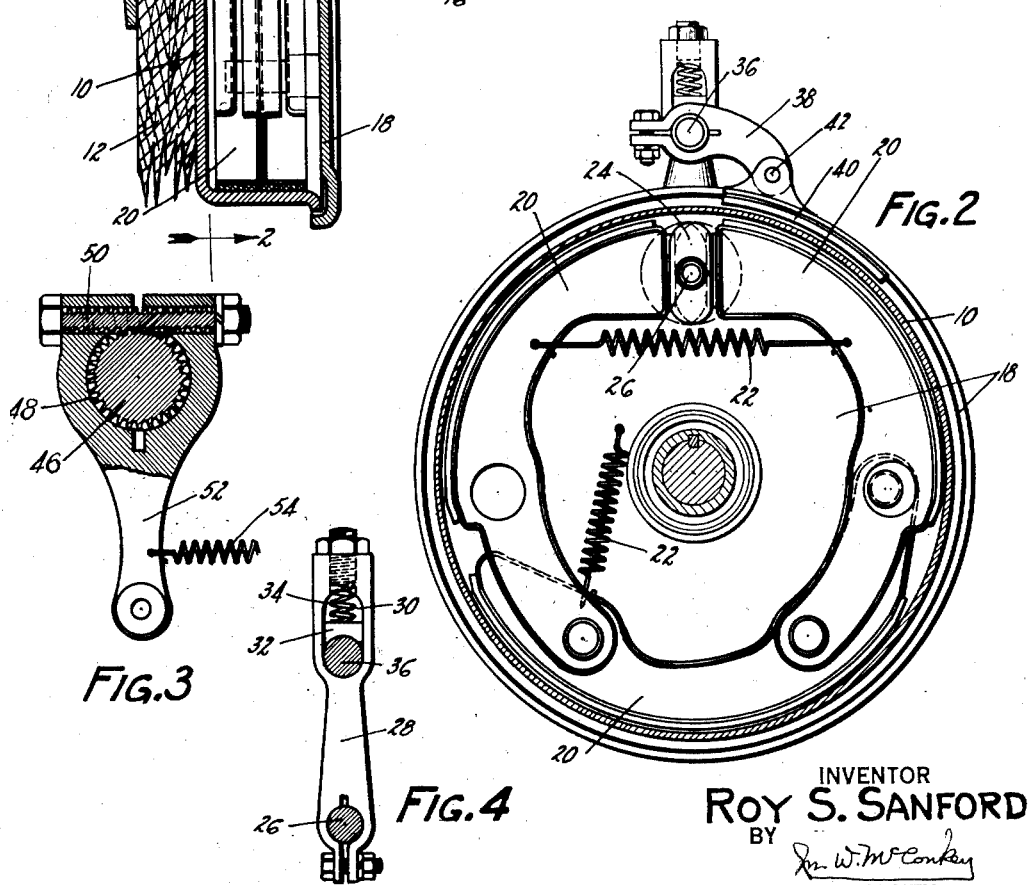
INVENTOR
ROY S. SANFORD
BY
*Jn. W. McConkey*
ATTORNEY Patented Mar. 17, 1931

1,796,809

UNITED STATES PATENT OFFICE

ROY S. SANFORD, OF SOUTH BEND, INDIANA, ASSIGNOR TO BENDIX BRAKE COMPANY, OF SOUTH BEND, INDIANA, A CORPORATION OF ILLINOIS

BRAKE

Application filed June 20, 1927. Serial No. 199,912.

This invention relates to brakes and is illustrated as embodied in a servo brake of the internal expanding type suitable for use on an automobile wheel. An object of the invention is to provide novel operating mechanism for the servo device and also through which the servo device operates the main friction means, together with a very fine adjustment suitable for use with a brake of this character.

Preferably the main friction means of the brake is arranged within the brake drum and the servo shoe or its equivalent is mounted for engagement with the outside of the same drum. Various features of novelty of the invention relate to the provision of an applying device for the main friction means which supports and is operated by a novel applying mechanism for the servo shoe. In the arrangement shown in the drawings, the shaft which operates the main friction means is provided with an operating arm which forms a support or bearing for the shaft which operates the servo shoe and which is therefore operated by the swinging of the shoe with the servo shoe.

Another feature of novelty relates to providing a very fine adjustment, such as is required in a brake of this character, by mounting a novel fitting on the end of the operating shaft which is formed with gear teeth on its periphery for engagement with a gear member carried by the encircling hub of an operating arm.

The above and other objects and features of the invention, including various novel combinations of parts and desirable particular constructions, will be apparent from the following description of one illustrative embodiment shown in the accompanying drawings, in which:

Figure 1 is a section diagrammatically through the brake in such a plane as to show the operating mechanism;

Figure 2 is a section on the line 2—2 of Figure 1, showing the shoes comprising the friction means within the drum;

Figure 3 is a section on the line 3—3 of Figure 1 showing the novel adjustment of the brake-applying arm; and Figure 4 is a section on the line 4—4 of Figure 1 showing the supporting of the shaft for the servo shoe on the arm which operates the main friction means.

In the arrangement selected for illustration the brake includes a drum 10 rotating with a wheel 12 driven by a live axle 14 within the usual rear axle housing 16. At the open side of the drum 10 is arranged a backing plate 18 or other suitable support.

The main friction means of the brake is preferably arranged within the drum 10, and is shown as comprising shoes 20 forced against the drum against the resistance of return springs 22 by means such as a double cam 24 keyed or otherwise secured on a shaft 26 which extends outside of the backing plate 18. An arm 28 clamped on the end of the shaft 26 is arranged to extend outwardly beyond the drum 10, and at its end is formed with a slot 30 for a block 32 urged downwardly by a compression spring 34 to cooperate with the bottom of the slot 30 to form a bearing for a servo operating shaft 36. An arm 38 is secured to the outer end of the shaft 36 and has a substantially rigid servo shoe 40 positively connected thereto by a pivot 42 which permits the servo shoe to turn slightly to adjust its position to the outer circumference of the brake drum but which is preferably tight enough to prevent movement of the shoe 40 except when it shifts to engage the outer periphery of the drum.

On the inner end of the shaft 36 there is secured or clamped by a clamp screw 44 a novel fitting 46 having worm teeth 48 cut on its periphery to mesh with the worm teeth of a bolt 50 which is arranged to bridge the solid hub of an operating arm 52 which is rocked against the resistance of a return spring 54 to apply the brake. When the bolt 50 is turned, the engagement of its teeth with the worm 48 will cause the shaft 36 to be turned slightly to compensate for wear of the servo shoe 40. The novel fitting 46 is preferably provided with a spindle 56 which is substantially coaxial with respect to the shaft 36 and which is universally and slidably supported by a ball 58 of bronze or Bakelite mounted in a spherical socket at the end of a bracket or support 60 secured to the axle housing.

In operation, the rocking of the arm 52 turns the shaft 36 to force the servo shoe 40 against the drum. Whichever direction the drum may be rotating, the shoe 40 is turned a short distance with it so that the shaft 36 causes angular movement of the arm forcing the shoes 20 against the inside of the brake drum.

While one illustrative embodiment has been described in detail, it is not my intention to limit the scope of the invention to that particular embodiment or otherwise than by the terms of the appended claims.

I claim:

1. A brake comprising, in combination, a drum, friction means within the drum having an operating shaft, an arm operating the shaft and extending outwardly beyond the drum, a servo shoe engageable with the outside of the drum, and operating means for the servo shoe including a rotatably supported swinging shaft engaging said arm and operated by movement of the servo shoe to apply the friction means.

2. A brake comprising, in combination, a drum, friction means within the drum, a servo shoe engageable with the outside of the drum, operating mechanism for the servo shoe including a rotatable shaft arranged to be swung by the servo shoe about a center adjacent one of its ends, and operating means within the drum which is actuated by the swinging of said shaft.

3. A brake comprising, in combination, a drum, and a plurality of friction devices engageable with the drum including a friction shoe and an operating shaft having at its end a crank arm directly pivoted to said shoe to apply the shoe to the drum and operatively coupled with another friction device to transmit brake applying pressure to said device from the shoe.

4. A brake including friction means and a servo device for operating the friction means, and comprising, in combination therewith, applying means for the friction means and an operating shaft for the servo device which is supported intermediate its ends by said applying means and which has a part adjacent one end coupled with the servo shoe to apply said shoe to the drum and a universally swiveled part adjacent the other end coupled therewith to support such end and transmit rotatable torque to the shaft.

5. A brake comprising, in combination, a drum, friction means within the drum having an operating shaft, an arm on the end of the shaft, and a servo device having an operating shaft journalled in the end of said arm and arranged to swing from one end crosswise of its axis to operate the arm.

6. Brake-applying mechanism comprising, in combination, a shaft, a fitting secured on the end of the shaft and formed on its periphery with worm teeth, and an arm having a split hub surrounding said periphery and provided with a clamping member bridging the split hub and formed with worm teeth meshing with the teeth of said fitting.

7. Brake-applying means comprising, in combination, a shaft, a fitting secured on the end of the shaft and formed on its periphery with teeth and having a spindle extending substantially co-axially with respect to the shaft, a universal support in which said spindle is journalled, and an operating arm surrounding the fitting and having a gear member meshing with said teeth.

8. Brake applying mechanism comprising, in combination, an operating shaft, a fitting removably adjustably mounted upon one end of the shaft and provided with a spindle extending axially away from such end of the shaft, a universal support in which said spindle is journaled to permit rotation of the shaft and limited swinging movement thereof transversely of its axis, and means operatively engaging said fitting to rotate the shaft.

9. A brake comprising in combination with retarding means, an operating shaft coupled at one end therewith to actuate the same and provided at its opposite end with a fitting having a spindle extending away from the end of the shaft, a support having a universal bearing in which said spindle is journaled to permit rotation of the shaft or swinging movement thereof.

10. A brake comprising, in combination, a rotatable drum, a plurality of friction devices engageable therewith including a servo shoe, an operating shaft for one of the other friction devices provided with an operating arm, an operating shaft for the servo shoe journaled in said arm for rotation and supported at one end for swinging movement transversely its axis of rotation.

11. A brake comprising, in combination, a rotatable drum, a plurality of friction devices engageable therewith including a servo shoe, an operating shaft for one of the other friction devices provided with an operating arm, an operating shaft for the servo shoe journaled in said arm intermediate its ends and provided at one end with an arm pivoted to the servo shoe and at the opposite end with a universally supported fitting adapted to rotate with the shaft or to permit the swinging thereof upon said fitting as a pivot.

12. A brake having a plurality of friction devices, an operating shaft for one device having an arm provided with a bearing, an operating shaft for another device journaled in said arm, and means yieldingly engaging and holding the same to a seat within said arm.

In testimony whereof, I have hereunto signed my name.

ROY S. SANFORD.